US009026136B2

United States Patent
Jin

(10) Patent No.: US 9,026,136 B2
(45) Date of Patent: May 5, 2015

(54) METHOD FOR IMPLEMENTING LOCATION UPDATE, SERVING GPRS SUPPORT NODE AND VISITOR LOCATION REGISTER

(71) Applicant: Huawei Device Co., Ltd., Shenzhen, Guangdong (CN)

(72) Inventor: Hui Jin, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 13 days.

(21) Appl. No.: 13/711,959

(22) Filed: Dec. 12, 2012

(65) Prior Publication Data

US 2013/0122865 A1 May 16, 2013

Related U.S. Application Data

(63) Continuation of application No. PCT/CN2011/073571, filed on Apr. 29, 2011.

(51) Int. Cl.
*H04W 24/00* (2009.01)
*H04W 64/00* (2009.01)
*H04W 60/00* (2009.01)

(52) U.S. Cl.
CPC .......... *H04W 64/00* (2013.01); *H04W 60/005* (2013.01); *Y02B 60/50* (2013.01)

(58) Field of Classification Search
USPC ................. 455/432.1, 433, 435.1, 436, 455/456.1–456.2
See application file for complete search history.

(56) References Cited

U.S. PATENT DOCUMENTS 7,486,957 B2 * 2/2009 Rajaniemi et al. .......... 455/456.1
7,782,818 B2 * 8/2010 Hurtta et al. ................. 370/331
(Continued)

FOREIGN PATENT DOCUMENTS

| CN | 1996795 A | 7/2007 |
| CN | 1997224 A | 7/2007 |

(Continued)

OTHER PUBLICATIONS

Foreign Communication From a Counterpart Application, Chinese Application 201180000306.1, Chinese Office Action dated Apr. 24, 2013, 9 pages.

(Continued)

*Primary Examiner* — Charles Appiah
*Assistant Examiner* — Jaime Holliday
(74) *Attorney, Agent, or Firm* — Conley Rose, P.C.; Grant Rodolph; Nicholas K. Beaulieu

(57) ABSTRACT

The present invention provides a method for implementing a location update that includes: receiving a routing area update request message which includes a mixed location update indication and a routing area identification (RAI) and is sent by a serving radio network subsystem (SRNS); performing, at least according to the RAI, a routing area update; at least according to the routing area update request message, obtaining a location area identification (LAI) and an address of a visitor location register (VLR) which are of a 2G network system where a mobile terminal is located; and sending the location area update request message, which carries at least the mixed location update indication and the LAI, to the VLR corresponding to the address of the VLR such that the VLR corresponding to the address of the VLR implements a location area update, at least according to the location area update request message.

24 Claims, 12 Drawing Sheets

(56) References Cited

U.S. PATENT DOCUMENTS 8,249,017 B2 * 8/2012 Chen et al. .................. 370/331
2008/0194287 A1 * 8/2008 Narang et al. ............. 455/552.1

FOREIGN PATENT DOCUMENTS

CN 101111059 A 1/2008
WO 0228116 A2 4/2002

OTHER PUBLICATIONS

Foreign Communication From a Counterpart Application, Chinese Application 201180000306.1, Partial English Translation of Chinese Office Action dated Apr. 24, 2013, 14 pages.

Communication from a foreign counterpart application, International Application No. PCT/CN2011/073571, International Search Report dated Feb. 9, 2012, 3 pages.

Communication from a foreign counterpart application, International Application No. PCT/CN2011/073571, English Translation, International Search Report dated Feb. 9, 2012, 3 pages.

Foreign Communication From a Counterpart Application, European Application No. 11758839.2, Extended European Search Report dated Jun. 6, 2013, 8 pages.

"3rd Generation Partnership Project; Technical Specification Group Services and System Aspects; General Packet Radio Service (GPRS); Service Description; Stage 2 (Release 10)," 3GPP TS 23.060, V10. 0.0, Jun. 10, 2010, 303 pages.

* cited by examiner

METHOD FOR IMPLEMENTING LOCATION UPDATE, SERVING GPRS SUPPORT NODE AND VISITOR LOCATION REGISTER

CROSS-REFERENCE TO RELATED APPLICATION

This application is a continuation of International Application No. PCT/CN2011/073571, filed on Apr. 29, 2011, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of mobile communications technologies, and in particular, to a method for implementing a location update, a serving general packet radio service (GPRS) support node, and a visitor location register.

BACKGROUND

In a mobile communications system, a location update is a very important process. The location update includes a location area update and a routing area update. When a mobile terminal changes a location area, it needs to notify a network system to perform the location area update. When the mobile terminal changes a routing area, it needs to interact with the network system to perform the routing area update.

With the development of communications technologies, a third-generation mobile communications technology, 3G technology, for example, a technology such as wideband code division multiple access (WCDMA), code division multiple access 2000 (CDMA2000), and time division-synchronous code division multiple access (TD-SCDMA) has been widely applied. A network system based on the 3G technology is capable of transmitting voice and data information at the same time. However, a network system based on a second-generation communications technology, 2G technology, has undergone long-term construction and provides better coverage than a 3G network. Therefore, generally, an existing terminal device based on the 3G network supports a 2G network so as to satisfy that a user can use a wireless service at any location. For example, most 3G mobile phones are dual-mode mobile phones that support a 2G/3G network system, for example, WCDMA/global system for mobile communications (GSM) dual mode and TD-SCDMA/GSM dual mode.

The 2G network and 3G network can support a circuit switched (CS) domain service and a packet switched (PS) domain service at the same time. A common voice service and short message service are mainly provided by a CS domain, and a data service is mainly provided by a PS domain. However, a network, such as a GSM network, among 2G networks with complete coverage are suitable for the voice service, and the 3G network with an advanced system, such as a TD-SCDMA network, are suitable for the data service. Therefore, generally, an existing dual-mode mobile terminal is designed to support a PS service of the 3G network and a CS service of the 2G network at the same time. For example, a single-card dual-mode (e.g., GSM/TD-SCDMA dual-mode) mobile phone uses two sets of antennas, two sets of radio frequency modules, and two independent protocol stacks, GSM protocol stack and TD-SCDMA protocol stack, so that a 2G system and a 3G system can operate on and access one universal subscriber identity module (USIM) card at the same time.

Such a single-card dual-mode mobile terminal can camp on the 2G network and 3G network. A PS domain of the 3G network has a plurality of routing areas, whereas a CS domain of the 2G network has a plurality of location areas. During a location area update and routing area update, an existing mobile terminal separately executes update processes on the 2G network and the 3G network, which increases the workload and power consumption of the mobile terminal and finally affects the technical performance of the mobile terminal.

SUMMARY

In view of this, the present invention provides a method for implementing a location update to solve a problem in the prior art that the calculation workload of a mobile terminal is heavy, the power consumption is large, and finally the technical performance of the mobile terminal is affected.

To achieve the preceding purpose, the present invention provides the following technical solutions:

An aspect of the present invention provides a method for implementing a location update, where the method includes: receiving a routing area update request message which contains at least a mixed location update indication and a routing area identification (RAI) and is sent by a serving radio network subsystem (SRNS), where the routing area update request message which contains at least the mixed location update indication and the RAI is generated after the SRNS adds the RAI to a received routing area update request message which contains at least the mixed location update indication and is sent by a mobile terminal; obtaining the RAI from the routing area update request message which contains at least the mixed location update indication and the RAI, and performing, at least according to the RAI, a routing area update; at least according to the routing area update request message which contains at least the mixed location update indication and the RAI, obtaining a location area identification (LAI) and an address of a visitor location register (VLR) which are of a 2G network system where the mobile terminal is located; and sending the location area update request message, which contains at least the mixed location update indication and the LAI, to the VLR corresponding to the address of the VLR, so that the VLR corresponding to the address of the VLR implements a location area update, at least according to the location area update request message.

Another aspect of the present invention provides a method for implementing a location update, where the method includes: receiving a location area update request message which contains at least a mixed location update indication and an LAI, where the location area update request message is sent by a serving GPRS support node (SGSN) of a 3G network system in response to a routing area update request message sent by the SRNS, and the routing area update request message is generated after the SRNS adds an RAI to a received routing area update request message which contains at least the mixed location update indication and is sent by the mobile terminal; and obtaining the LAI from the location area update request message, and implementing, at least according to the LAI, a location area update.

Another aspect of the present invention provides a serving GPRS support node including: a routing area request message receiving module configured to receive a routing area update request message which contains at least a mixed location update indication and an RAI and is sent by a SRNS, where the routing area update request message which contains at least the mixed location update indication and the RAI is generated after the SRNS adds the RAI to a received routing area update request message which contains at least the mixed location update indication and is sent by a mobile terminal; a routing area updating module configured to obtain the RAI from the routing area update request message which contains at least the mixed location update indication and the RAI and is received by the receiving module, and perform, at least according to the RAI, a routing area update; an obtaining module configured to, at least according to the routing area update request message which contains at least the mixed location update indication and the RAI, obtain an LAI and an address of a VLR of a 2G network system where the mobile terminal is located; and a sending module configured to send the location area update request message, which contains at least the mixed location update indication and the LAI, to the VLR corresponding to the address of the VLR, so that the VLR corresponding to the address of the VLR implements a location area update, at least according to the location area update request message.

Another aspect of the present invention provides a visitor location register including: a location area request message receiving module configured to receive a location area update request message which contains at least a mixed location update indication and an LAI, where the location area update request message is sent by a serving GPRS support node SGSN of a 3G network system in response to a routing area update request message sent by an SRNS, and the routing area update request message is generated after the SRNS adds the RAI to a received routing area update request message which contains at least the mixed location update indication and is sent by a mobile terminal; and a location area updating module configured to implement a location area update, at least according to the LAI contained in the location area update request message received by the location area request message receiving module.

From the preceding technical solutions, it can be known that, compared with the prior art, the present invention provides a method for implementing a location update, a serving GPRS support node, and a visitor location register, where a mobile terminal carries a mixed location update indication when sending a routing area update request to a 3G network system, and at the same time of a routing area update, sends a location area update request to the VLR of a 2G network system, and the 2G network system performs a location area update, thereby implementing updates of a location area and routing area for the mobile terminal at the same time, reducing the workload of the mobile terminal, and solving a problem that the technical performance of the mobile terminal is finally affected due to large power consumption.

BRIEF DESCRIPTION OF THE DRAWINGS

To illustrate technical solutions in embodiments of the present invention or in the prior art, accompanying drawings to be used in the description of the embodiments or the prior art are introduced briefly in the following. Apparently, the accompanying drawings in the following description are only embodiments of the present invention. Those skilled in the art may obtain other drawings based on these accompanying drawings without making creative efforts.

DETAILED DESCRIPTION

Technical solutions in embodiments of the present invention are described clearly and completely in the following with reference to accompanying drawings in the embodiments of the present invention. Evidently, the described embodiments are only part rather than all of the embodiments of the present invention. All the other embodiments obtained by persons of ordinary skill in the art based on the embodiments of the present invention without creative efforts fall within the protection scope of the present invention.

Figure 1:
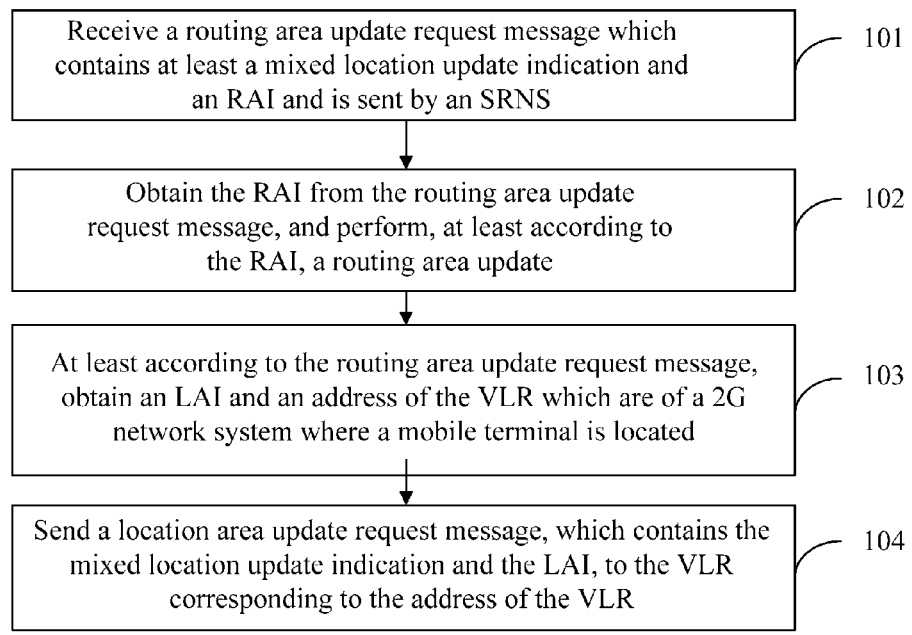
FIG. 1 is a flowchart of a first embodiment of a method for implementing a location update according to the present invention.

FIG. 1 is a flowchart of a first embodiment of a method for implementing a location update according to the present invention. The following steps are included:

Step 101: Receive a routing area update request message which contains at least a mixed location update indication and a routing area identification (RAI) and is sent by a serving radio network subsystem (SRNS).

In this embodiment, a routing area update request sent by the SRNS is received by a serving GPRS support node (SGSN) in a 3G network system.

The RAI is used for routing area selection of a mobile user. In the 3G network system, a mobile terminal sends the SRNS a routing area update request message that carries the mixed location update indication, and the SRNS identifies the mobile terminal to perform a mixed location update process, adds the RAI to the routing area update request message, and then sends the message to the SGSN.

In the embodiment of the present invention, the location update includes a routing area update and a location area update. The routing area update refers in particular to a location update performed in a packet switched (PS) domain in a 3G/2G network system, and the location area update refers in particular to a location update performed in a circuit switched (CS) domain in the 3G/2G network system.

In the embodiment of the present invention, the mobile terminal is a dual-mode mobile terminal, and the dual-mode mobile terminal can support a 3G network and a 2G network at the same time. In this embodiment, the location update means that at the same time when a mobile terminal in the PS domain of a 3G network performs a location update, a location update on a 2G network is implemented.

When performing a voice call, the mobile terminal undergoes a location area update when moving across location areas; during a data call, the mobile terminal undergoes a routing area update when moving across routing areas. In a 3G network system, the SGSN is responsible for management of routing areas; in a 2G network system, a visitor location register (VLR) is responsible for management of location areas.

Step 102: Obtain the RAI from the routing area update request message which contains at least the mixed location update indication and the RAI, and perform, at least according to the RAI, a routing area update.

After the routing area update request message is received, a routing area update in the 3G network system may be performed. This update process is the same as an existing routing area update process and is not described in detail herein again.

Those skilled in the art may know that: To protect a network and the mobile user, before the routing area update, authentication needs to be performed on the mobile terminal, and after the authentication is successful, the routing area update is performed; meanwhile, a routing area update message may be sent to a home location register (HLR) so that the HLR stores and manages location information of the mobile terminal.

Step 103: At least according to the routing area update request message, obtain a location area identification (LAI) and an address of a VLR which are of a 2G network system where the mobile terminal is located.

The LAI may be obtained through interception by the mobile terminal in the 2G network system. Then, the routing area update request message further includes the LAI intercepted by the mobile terminal, and the LAI may be obtained from the routing area update request message. Alternatively, in a case of joint network deployment, an RAI in the 3G network system and an RAI in the 2G network system are the same, and LAIs are also the same. The LAI of the 2G network to which the mobile terminal belongs may be obtained, according to the RAI contained in the routing area update request message and through a formula LAI=RAI+RAC, where RAC is a routing area code (RAC) which is stored by the SGSN and is of a 3G network system where the mobile terminal is located.

In the 2G network system, a mapping relationship exists between an LAI and a VLR. According to the mapping relationship, the address of the VLR corresponding to the LAI may be known.

Step 104: Send a location area update request message, which contains at least the mixed location update indication and the LAI, to the VLR corresponding to the address of the VLR.

The VLR is used for managing and updating a location area. After the address of the VLR is known, the location area update request message may be sent to the VLR. The location area update request message contains the LAI and carries the mixed location update indication, so that the VLR knows, after receiving the location area update request message, that it is a request for performing a mixed location area update and interacts, according to the LAI, with a mobile switching center (MSC) and the HLR, so as to implement a location area update.

After the location area update is completed, the VLR returns a location area update acknowledgment message (e.g., a "Location Update Accept") to the SGSN. After receiving the location area update acknowledgment message, a routing area update acknowledgment message (e.g., a "Routing Update Accept") is sent to the mobile terminal to notify the mobile terminal of accepting the update to facilitate a corresponding update operation.

It should be noted that the operation in step 102 is not limited to the sequence in this embodiment and may also be performed after or at the same time of any one of step 103 to step 104.

In this embodiment, the location area update in the 2G network system is implemented at the same time when the routing area update is performed in the 3G network system, thereby implementing location updates of the mobile terminal at the same time, reducing the workload of the mobile terminal, and solving a problem that the technical performance of the mobile terminal is finally affected due to large power consumption.

Figure 2:
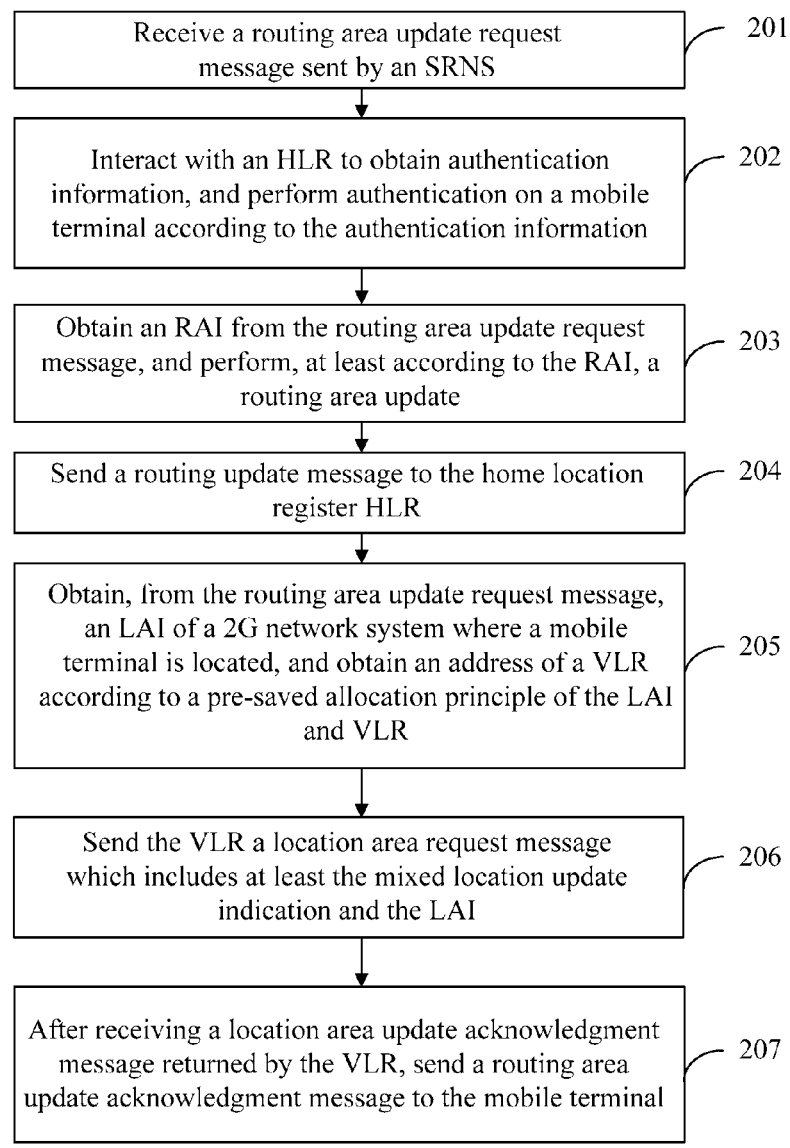
FIG. 2 is a flowchart of a second embodiment of a method for implementing a location update according to the present invention.

FIG. 2 is a flowchart of a second embodiment of a method for implementing a location update according to the present invention. The following steps are included:

Step 201: Receive a routing area update request message sent by an SRNS.

The routing area update request message contains a mixed location update indication, an RAI, and an LAI obtained through interception by a mobile terminal in a 2G network system.

In this embodiment, the routing area update request message sent by the SRNS is received by an SGSN in the 3G network system. The mobile terminal first sends the SRNS a routing area update request message that carries the mixed location update indication, and the SRNS identifies the mobile terminal to perform a mixed update process, writes the RAI to the routing area update request message, and then sends the message to the SGSN.

Step 202: Interact with an HLR to obtain authentication information and perform authentication on the mobile terminal according to the authentication information.

The HLR stores subscription data of a managed user and location information of a mobile user, and saves authentication information of the user in the register. The SGSN in the 3G network system requests obtaining authentication information from the HLR. The HLR returns an authentication parameter and a key to the SGSN, and authentication is performed on the mobile terminal according to the authentication parameter and key.

Step 203: Obtain the RAI from the routing area update request message and perform, at least according to the RAI, a routing area update.

After the authentication is successful, that is, after an authentication response returned by the mobile terminal is received, a temporary identification is allocated to the mobile terminal, to implement the routing area update.

Step 204: Send a routing area update message to the home location register HLR.

After the routing area update is implemented, the routing area update message is sent to the HLR, so that the HLR performs recording and management.

Step 205: Obtain, from the routing area update request message, the LAI of the 2G network system where the mobile terminal is located, and obtain, according to a pre-saved allocation principle of the LAI and a VLR, an address of a VLR of the 2G network system where the mobile terminal is located.

In this embodiment, the routing area update request message further contains the LAI intercepted by the mobile terminal in the 2G network system. The LAI may be directly obtained from the routing area update request message.

The allocation principle refers to a mapping relationship between an LAI and a VLR. A system predefines which LAI is allocated to which VLR. According to this allocation principle, the address of the VLR in the 2G network system where the mobile terminal is located may be obtained.

Step 206: Send a location area update request message, which contains at least the mixed location update indication and the LAI, to the VLR corresponding to the address of the VLR.

Where, the location area update request message is used to instruct the VLR to implement a location area update.

Step 207: After receiving a location area update acknowledgment message returned by the VLR corresponding to the address of the VLR, send a routing area update acknowledgment message to the mobile terminal.

After the location area update is implemented, the VLR corresponding to the address of the VLR returns the location area update acknowledgment message. After receiving the location area update acknowledgment message, the SGSN sends a routing area update acknowledgment message to the mobile terminal to notify the mobile terminal of accepting the update.

It should be noted that operations for implementing the routing area update in steps 202 to 204 are not limited to the sequence described in this embodiment and may also be performed after or at the same time of any one of step 205 to step 206.

In this embodiment, after receiving the routing area update request message that contains the mixed location update indication, the SGSN of the 3G network system obtains the LAI and the address of the VLR which are in the 2G network system where the mobile terminal is located and then sends the location area update request message to the VLR corresponding to the address of the VLR, thereby implementing updates of a routing area and location area at the same time, reducing the workload of the mobile terminal, and solving a problem that the technical performance of the mobile terminal is finally affected due to large power consumption.

Figure 3:
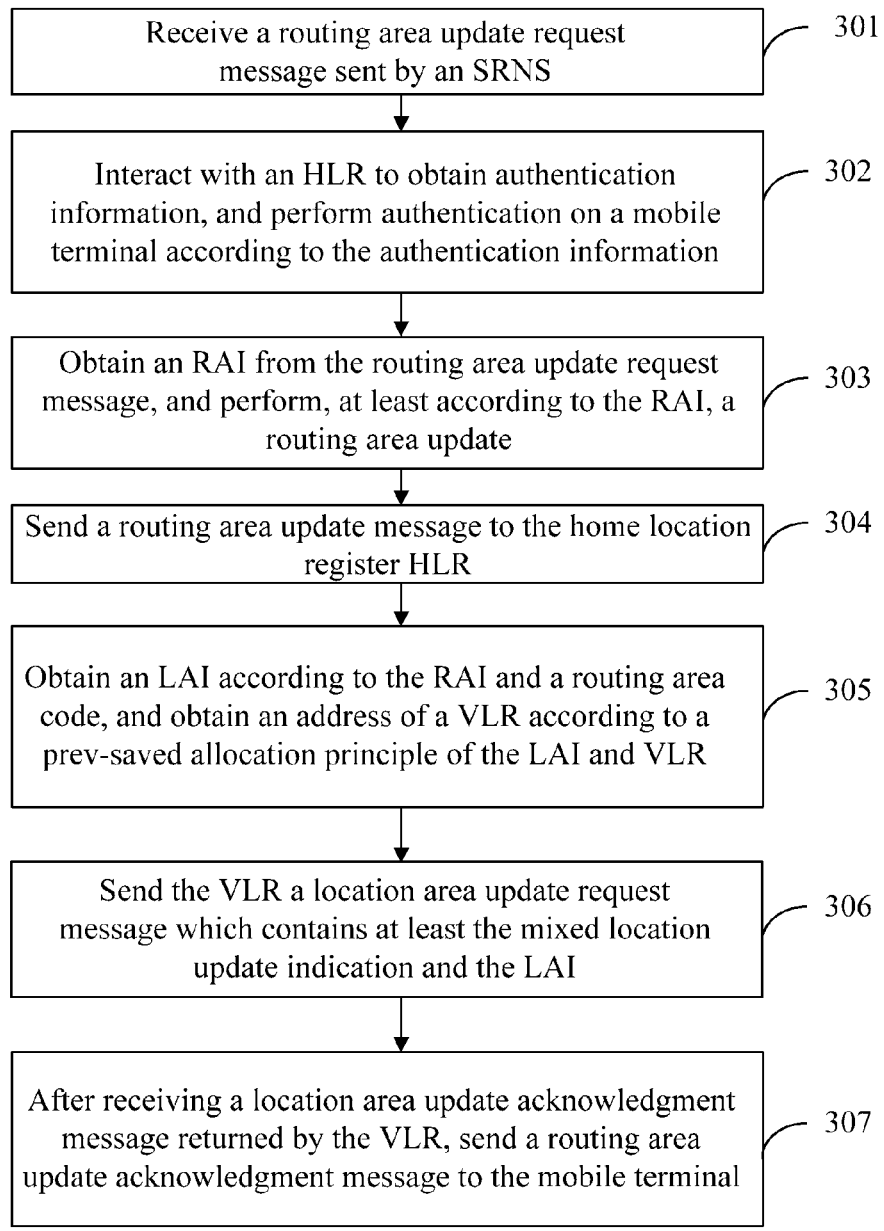
FIG. 3 is a flowchart of a third embodiment of a method for implementing a location update according to the present invention.

FIG. 3 is a flowchart of a third embodiment of a method for implementing a location update according to the present invention. The following steps are included:

Step 301: Receive a routing area update request message sent by an SRNS.

The routing area update request message contains a mixed location update indication and an RAI.

In this embodiment, the routing area update request message sent by the SRNS is received by an SGSN in a 3G network system. The mobile terminal first sends the SRNS a routing area update request message that carries the mixed location update indication, and the SRNS identifies the mobile terminal to perform a mixed update process, writes the RAI to the routing area update request message, and sends the message to the SGSN.

Step 302: Interact with a home location register (HLR) to obtain authentication information and perform authentication on the mobile terminal according to the authentication information.

Step 303: Obtain the RAI from the routing area update request message and perform, at least according to the RAI, a routing area update.

Step 304: Send a routing area update message to the home location register HLR.

Step 305: Obtain, according to the RAI and a saved routing area code, a location area identification (LAI) of a 2G network system where the mobile terminal is located, and obtain, according to a pre-saved allocation principle of the LAI and a VLR, an address of a VLR of the 2G network system where the mobile terminal is located.

In a case of joint network deployment, RAIs in the 3G network system and the 2G network system are the same, and LAIs are the same. The LAI of the 2G network system where the mobile terminal is located may be known according to the RAI in the routing area update request message and the routing area code (RAC) saved by the SGSN, and according to a formula LAI=RAI+RAC.

Step 306: Send a location area update request message, which contains at least the mixed location update indication and the LAI, to the VLR corresponding to the address of the VLR.

The location area update request message is used as a basis for the VLR to implement a location area update.

Step 307: After receiving a location area update acknowledgment message returned from the VLR corresponding to the address of the VLR, sending a routing area update acknowledgment message to the mobile terminal.

It should be noted that operations for implementing the routing area update in steps 302 to 304 are not limited to the sequence described in this embodiment and may also be performed after or at the same time of any one of step 305 to step 306.

In this embodiment, after receiving the routing area update request message that contains the mixed location update indication and the RAI, the SGSN of the 3G network system obtains, according to a relationship between the RAI and the LAI, and the allocation principle of the LAI and VLR in the 2G network system, the LAI and address of the VLR which are of the 2G network system where the mobile terminal is located, and then sends the location area update request message to the VLR corresponding to the address of the VLR, thereby implementing updates of a routing area and location area at the same time, reducing the workload of the mobile terminal, and solving a problem that the technical performance of the mobile terminal is finally affected due to large power consumption.

Figure 4:
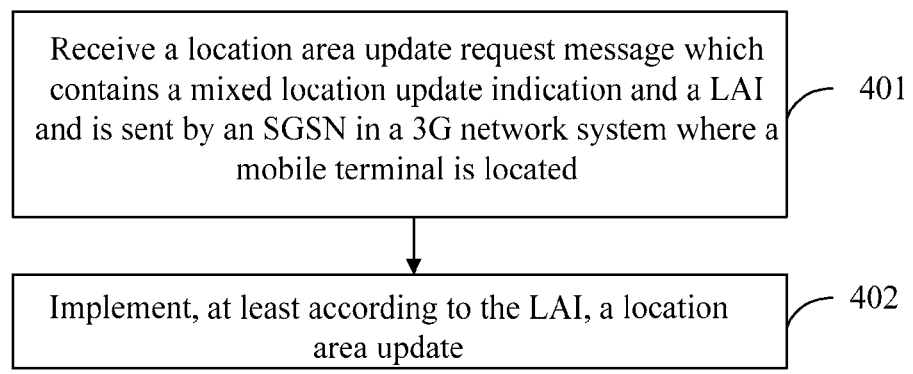
FIG. 4 is a flowchart of a fourth embodiment of a method for implementing a location update according to the present invention.

FIG. 4 is a flowchart of a fourth embodiment of a method for implementing a location update according to the present invention. The following steps are included:

Step 401: Receive a location area update request message that contains at least a mixed location update indication and an LAI, where the location area update request message is sent by an SGSN in a 3G network system in response to a routing area update request sent by an SRNS.

The routing area update request is generated after the SRNS adds an RAI to a received routing area update request message which contains at least the mixed location update indication and is sent by a mobile terminal.

In this embodiment, the mobile terminal implements a location area update in a 2G network system at the same time of performing a routing area update in the 3G network system. In this step, the location area update request message sent by the SGSN in the 3G network system where the mobile terminal is located is received by a VLR in the 2G network system. After receiving the routing area update request message which carries the mixed location update indication and is sent by the mobile terminal, the SGSN obtains an LAI and an address of a VLR which are of the 2G network system where the mobile terminal is located. For a specific operation process, reference may be made to the descriptions of the first, second, or third embodiment of the method, and the details are not described herein again. Afterwards, the location area update request message may be sent to the VLR.

Step 402: Obtain the LAI from the location area update request message and implement, at least according to the LAI, a location area update.

After the location area update request message is received by the VLR, it is known that it is a mixed location update request. Interaction is performed with an MSC and HLR according to the LAI in the location area update request message, so as to implement the location area update.

To protect network security, during the location area update, authentication needs to be performed on the mobile terminal. Meanwhile, a location area update message may be sent to the HLR, so that the HLR stores and manages location information of the mobile terminal.

After the location area update is implemented, a location area update acknowledgment message may be returned to the SGSN in the 3G network system. After receiving the location area update acknowledgment message, the SGSN sends a routing area update acknowledgment message to the mobile terminal to notify the mobile terminal to accept the update.

In this embodiment, at the same time of performing the routing area update in the 3G network system, the VLR in the 2G network system receives the location area update request message sent by the SGSN in the 3G network system to implement the location area update in the 2G network system, thereby implementing a mixed location update of the mobile terminal, reducing the workload of the mobile terminal, and solving a problem that the technical performance of the mobile terminal is finally affected due to large power consumption.

Figure 5:
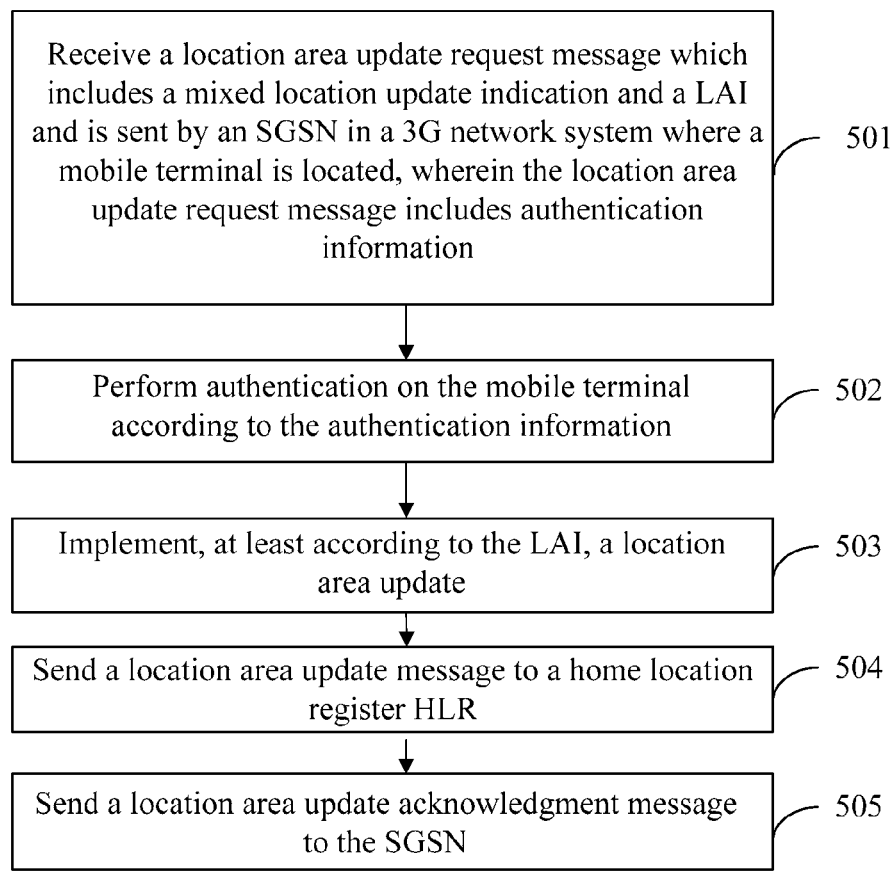
FIG. 5 is a flowchart of a fifth embodiment of a method for implementing a location update according to the present invention.

FIG. 5 is a flowchart of a fifth embodiment of a method for implementing a location update according to the present invention. The following steps are included:

Step 501: Receive a location area update request message that contains a mixed location update indication and an LAI, where the location area update request message is sent by an SGSN in response to a routing area update request sent by an SRNS.

The routing area update request is generated after the SRNS adds an RAI to a received routing area update request message which contains at least the mixed location update indication and is sent by a mobile terminal, where the location area update request message further contains authentication information, and where the authentication information is obtained by the SGSN through interaction with the HLR when authentication is performed on the mobile terminal during a routing area update.

Step 502: Obtain the authentication information from the location area update request message and perform authentication on the mobile terminal according to the authentication information.

Step 503: Obtain the LAI from the location area update request message and implement, at least according to the LAI, a location area update.

After the authentication is successful, that is, after the VLR receives an authentication response sent by the mobile terminal, the VLR interacts with an MSC, and the VLR starts a location update program, thereby implementing the location area update.

Step 504: Send a location area update message to an HLR.

Step 505: Send a location area update acknowledgment message to the SGSN.

After the location area update is completed, the location area update acknowledgment message is sent to the SGSN in a 3G network system, so that the SGSN sends a routing area update acknowledgment message to the mobile terminal after receiving the location area update acknowledgment message.

In the embodiment of the present invention, after receiving the location area update request message that contains the mixed location update indication, the authentication is performed on the mobile terminal, and the location area update is performed after the authentication is successful. The location area update in this embodiment is performed at the same time when the routing area update is performed in the 3G network system, thereby reducing the workload of the mobile terminal, and solving a problem that the technical performance of the mobile terminal is finally affected due to large power consumption.

Figure 6:
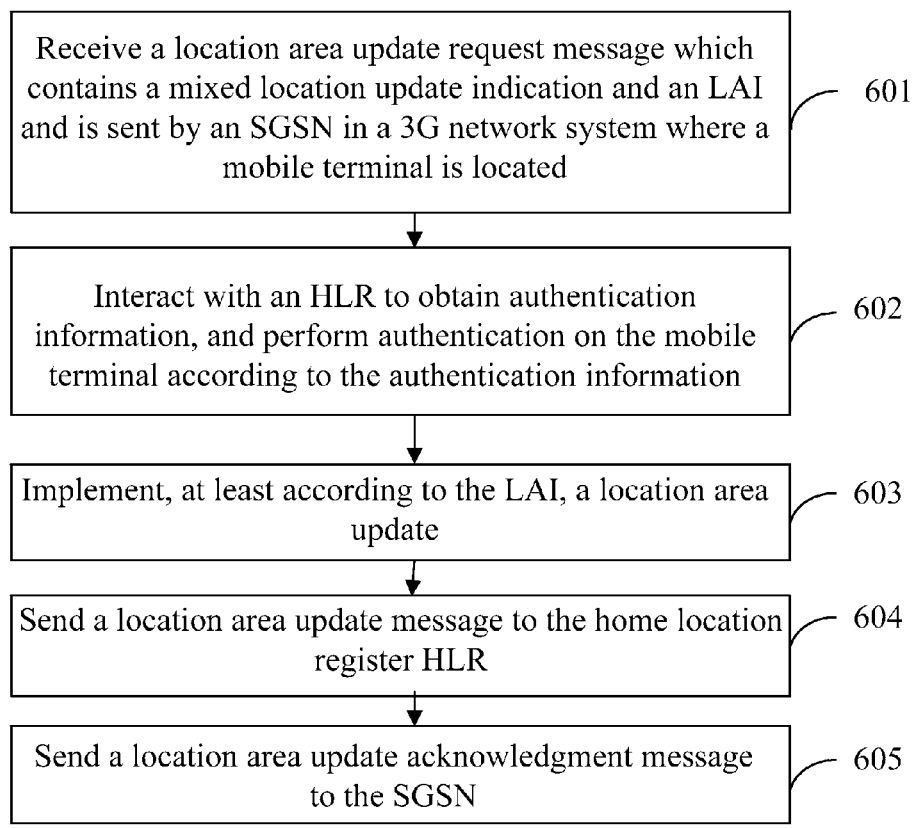
FIG. 6 is a flowchart of a sixth embodiment of a method for implementing a location update according to the present invention.

Referring to FIG. 6, a flowchart of a sixth embodiment of a method for implementing a location update according to the present invention is shown. The following steps may be included:

Step 601: Receive a location area update request message that contains a mixed location update indication and an LAI, where the location area update request message is sent by an SGSN in response to a routing area update request sent by an SRNS.

The routing area update request is generated after the SRNS adds an RAI to a received routing area update request message which contains at least the mixed location update indication and is sent by a mobile terminal.

Step 602: Interact with an HLR to obtain authentication information, and perform authentication on the mobile terminal according to the authentication information.

A VLR requests obtaining the authentication information from the HLR. The authentication information includes content such as an authentication parameter and a key. The VLR implements an authentication process for the mobile terminal according to the authentication information.

Step 603: Obtain the LAI from the location area update request message and implement, at least according to the LAI, a location area update.

After the authentication is successful, that is, after an authentication response sent by the mobile terminal is received, an MSC interacts with the VLR, and the VLR starts a location update program, thereby implementing the location area update.

Step 604: Send a location area update message to the HLR.

Step 605: Send a location area update acknowledgment message to the SGSN.

The difference between this embodiment and the fifth embodiment is the need to interact with the HLR to obtain authentication information. For other steps, reference may be made to each other.

For the ease of description, each of the preceding method embodiments is expressed as a series of action combinations. However, those skilled in the art should know that the present invention is not limited to the described action sequences because certain steps according to the present invention may be performed in other sequences or synchronously. Secondly, those skilled in the art should know that all the embodiments described in this specification belong to exemplary embodiments, and the involved actions or modules are not certainly necessary to the present invention.

Figure 7:
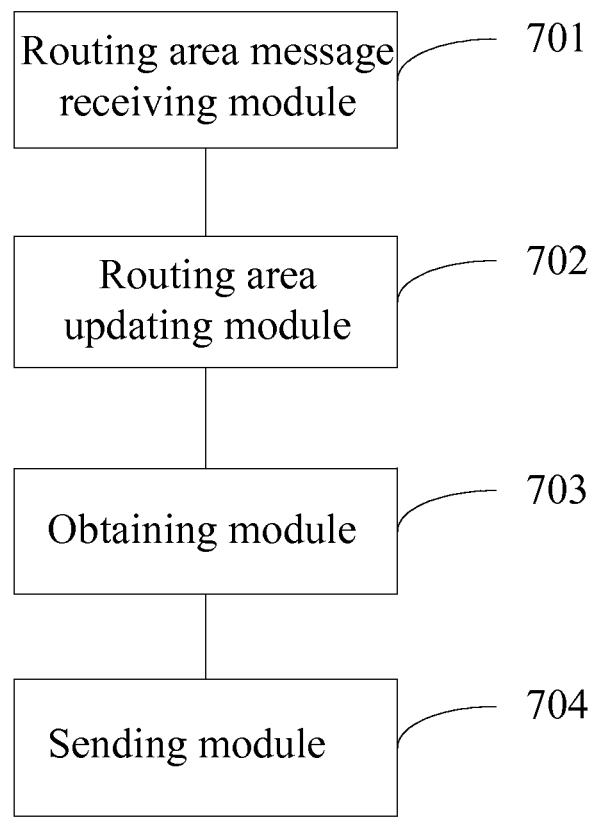
FIG. 7 is a structural schematic diagram of a first embodiment of a serving GPRS support node according to the present invention.

Corresponding to the first embodiment of the method for implementing the location update, FIG. 7 is a schematic structural diagram of a first embodiment of a serving GPRS support node according to the present invention that includes:

A routing area request message receiving module 701 configured to receive a routing area update request message sent by an SRNS.

The routing area update request message contains at least a mixed location update indication and an RAI.

In a 3G network system, a mobile terminal sends the SRNS a routing area update request message that contains the mixed location update indication, and the SRNS identifies the mobile terminal to perform a mixed location update process, writes the RAI to the routing area update request message, and then sends the message to the SGSN. The message is received by the routing area request message receiving module 701.

A routing area updating module 702 is configured to obtain the RAI from the routing area update request message received by the routing area request message receiving module 701 and perform, at least according to the RAI, a routing area update.

An obtaining module 703 is configured to, at least according to the routing area update request message, obtain a location area identification (LAI) and an address of a visitor location register VLR which are of a 2G network system where the mobile terminal is located.

A sending module 704 is configured to send the location area update request message, which contains the mixed location update indication and the LAI, to the VLR corresponding to the address of the VLR, so that the VLR performs a location area update, at least according to the location area update request message.

In this embodiment, it is implemented through the SGSN that the mobile terminal performs the routing area update in the 3G network system at the same time of performing the location area update in the 2G network system, thereby reducing the workload of the mobile terminal and solving a problem that the technical performance of the mobile terminal is finally affected due to large power consumption.

Figure 8:
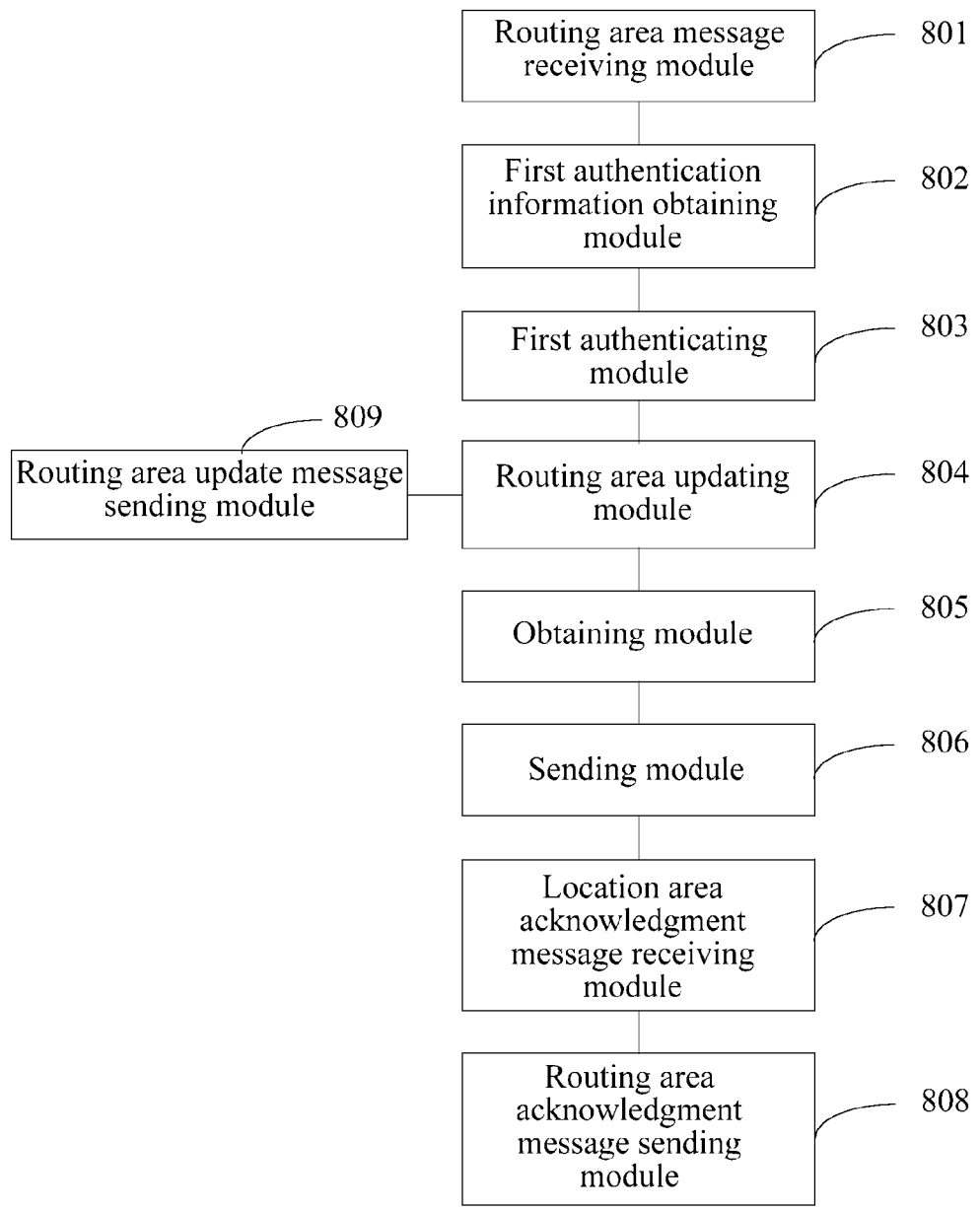
FIG. 8 is a structural schematic diagram of a second embodiment of a serving GPRS support node according to the present invention.

FIG. 8 is a structural schematic diagram of a second embodiment of a serving GPRS support node according to the present invention that includes: a routing area request message receiving module 801 configured to receive a routing area update request message sent by an SRNS, where the routing area update request message contains a mixed location update indication, a routing area identification (RAI), and a location area identification (LAI) which is intercepted by a mobile terminal in a 2G network system; a first authentication information obtaining module 802 configured to obtain authentication information through interaction with a home location register (HLR); a first authenticating module 803 configured to perform authentication on the mobile terminal according to the authentication information; a routing area updating module 804 configured to, after the authenticating module 803 succeeds in the authentication, obtain the RAI from the routing area update request message received by the routing area request message receiving module 801 and perform, at least according to the RAI, a routing area update; an obtaining module 805 configured to obtain, from the routing area update request message received by the routing area request message receiving module 801, the LAI of the 2G network system where the mobile terminal is located and obtain, according to a pre-saved allocation principle of the LAI and a VLR, an address of a VLR of the 2G network system where the mobile terminal is located; a sending module 806 configured to send the VLR a location area update request message that contains at least the mixed location update indication and the LAI, where the location area update request message is used to instruct the VLR to implement a location area update; a location area acknowledgment message receiving module 807 configured to receive a location area update acknowledgment message returned by the VLR; and a routing area acknowledgment message sending module 808 configured to send a routing area update acknowledgment message to the mobile terminal after the location area update acknowledgment message receiving module 807 receives the location area update acknowledgment message.

Preferably, the SGSN may further include a routing area update message sending module 809 configured to send a routing area update message to the home location register (HLR).

In this embodiment, after receiving the routing area update request message that contains at least the mixed location update indication and the RAI, the SGSN of a 3G network system obtains the LAI and address of the VLR which are in the 2G network system where the mobile terminal is located and then sends the location area update request message to the VLR corresponding to the address of the VLR, thereby implementing updates of a routing area and location area at the same time, reducing the workload of the mobile terminal, and solving a problem that the technical performance of the mobile terminal is finally affected due to large power consumption.

Figure 9:
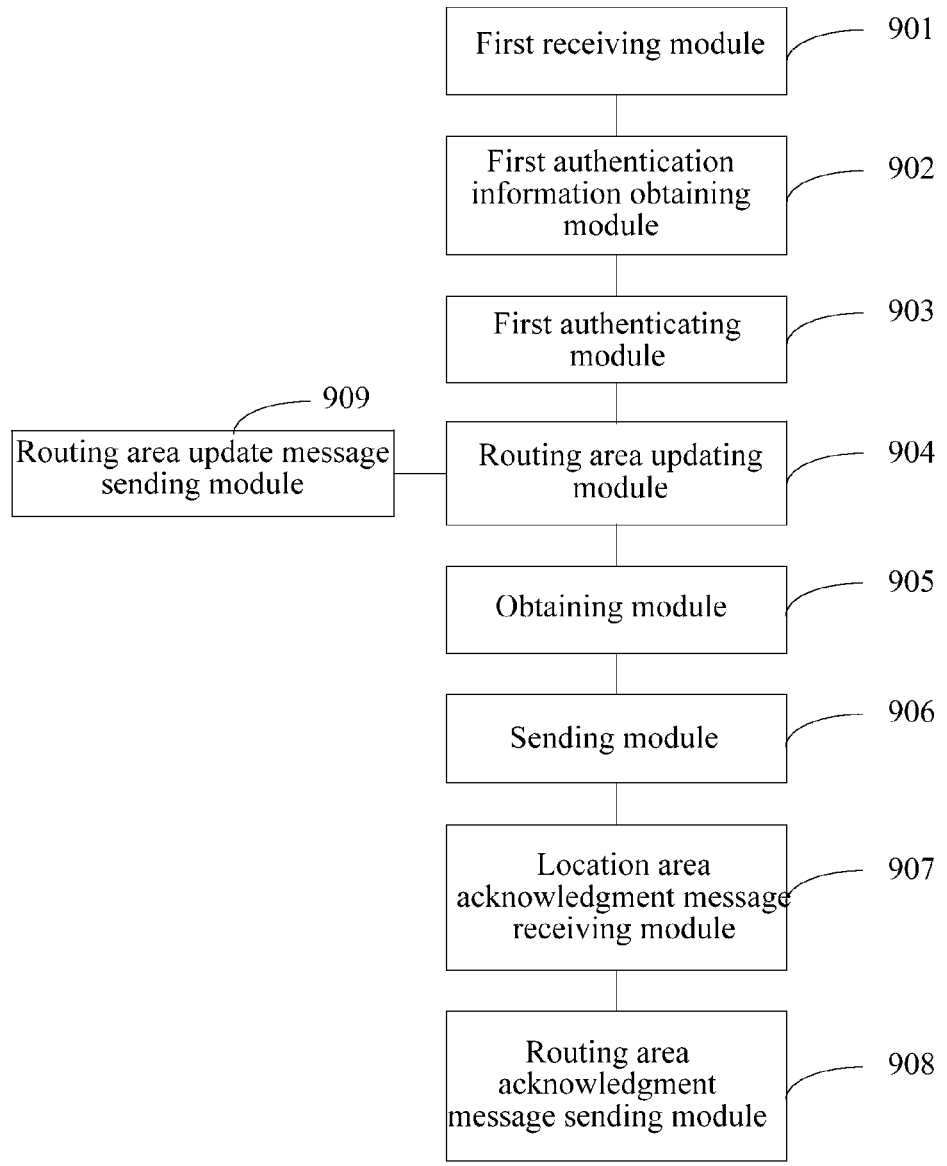
FIG. 9 is a structural schematic diagram of a third embodiment of a serving GPRS support node according to the present invention.

FIG. 9 is a structural schematic diagram of a third embodiment of a serving GPRS support node according to the present invention. This apparatus differs from the second apparatus embodiment in that an obtaining module 905 is configured to obtain, according to an RAI and a saved routing area code RAC, an LAI of a 2G network system where a mobile terminal is located and obtain, according to a pre-saved allocation principle of the LAI and a VLR, an address of a VLR of the 2G network system where the mobile terminal is located. For other modules and functions, reference may be made to each other, and the details are not described herein again.

Figure 10:
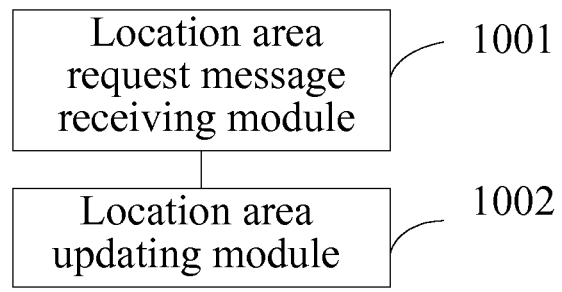
FIG. 10 is a structural schematic diagram of a first embodiment of a visitor location register according to the present invention.

Corresponding to the fourth embodiment of the method for implementing location area update, FIG. 10 is a structural schematic diagram of a first embodiment of a visitor location register according to the present invention. This apparatus may include:

A location area request message receiving module 1001 configured to receive a location area update request message that contains at least a mixed location update indication and a location area identification LAI.

The location area update request message is sent by an SGSN in response to the routing area update request sent by an SRNS. The routing area update request message is generated after the SRNS adds an RAI to a received routing area update request message which contains at least the mixed location update indication and is sent by a mobile terminal.

A location area updating module 1002 is configured to obtain the LAI from the location area update request message received by the location area request message receiving module 1001 and implement, at least according to the LAI, a location area update.

In this embodiment, at the same time of performing a routing area update in a 3G network system, the location area update request message sent by the SGSN in the 3G network system is received to implement the location area update in an 2G network system, thereby implementing a mixed location area/routing area update of the mobile terminal, reducing the workload of the mobile terminal, and solving a problem that the technical performance of the mobile terminal is finally affected due to large power consumption.

Figure 11:
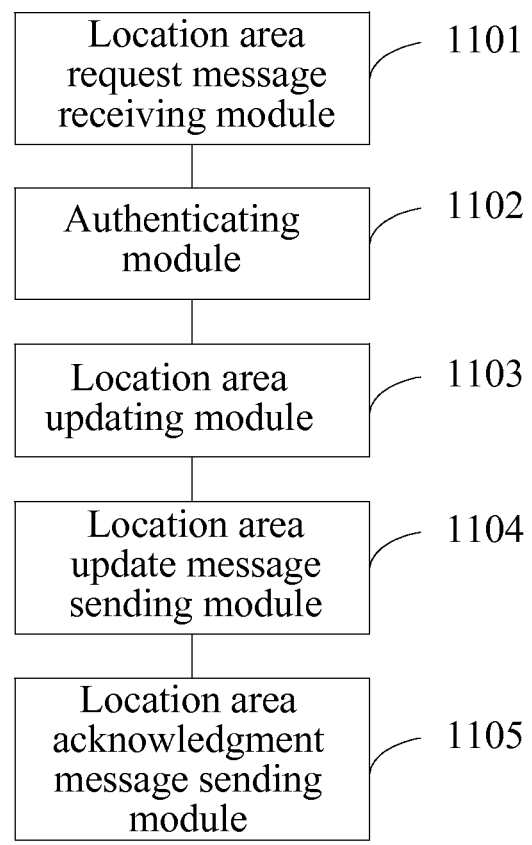
FIG. 11 is a structural schematic diagram of a second embodiment of a visitor location register according to the present invention.

FIG. 11 is a structural schematic diagram of a second embodiment of a visitor location register according to the present invention that includes:

A location area request message receiving module 1101 configured to receive a location area update request message that contains a mixed location update indication and a location area identification LAI.

The location area update request message is sent by an SGSN in response to a routing area update request sent by an SRNS. The routing area update request message is generated after the SRNS adds an RAI to a received routing area update request message which contains at least the mixed location update indication and is sent by a mobile terminal.

The location area update request message further includes authentication information, where the authentication information is obtained by the SGSN through interaction with an HLR when authentication is performed on the mobile terminal during a routing area update.

An authenticating module 1102 is configured to perform authentication on the mobile terminal according to the authentication information.

A location area updating module 1103 is configured to, after the authenticating module 1102 succeeds in the authentication, obtain the LAI from the location area update request message and implement, at least according to the LAI, a location area update.

A location area update message sending module 1104 is configured to send a location area update message to the home location register HLR.

A location area acknowledgment message sending module 1105 configured to send a location area update acknowledgment message to the SGSN.

In this embodiment, after receiving the location area update request message that contains the mixed location update indication, the VLR in a 2G network system performs the authentication on the mobile terminal and performs the location area update after the authentication is successful. The location area update in this embodiment may be performed at the same time of performing the routing area update in a 3G network system, thereby reducing the workload of the mobile terminal and solving a problem that the technical performance of the mobile terminal is finally affected due to large power consumption.

Figure 12:
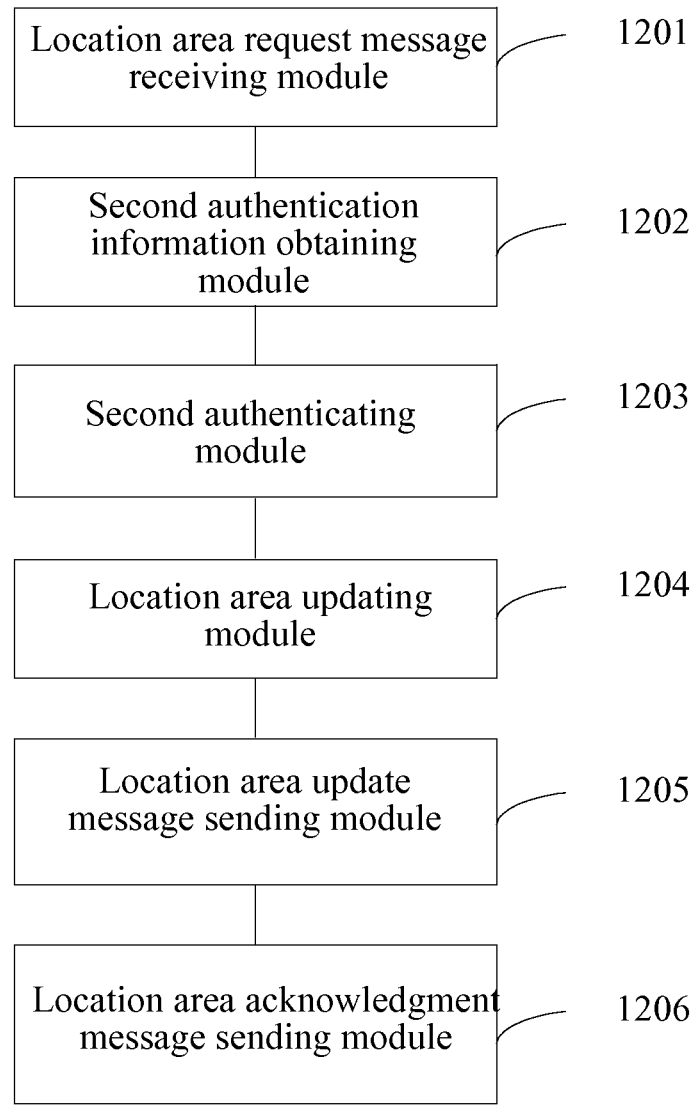
FIG. 12 is a structural schematic diagram of a third embodiment of a visitor location register according to the present invention.

FIG. 12 is a structural schematic diagram of a third embodiment of a visitor location register according to the present invention that includes: a location area request receiving module 1201 configured to receive a location area update request message that contains a mixed location update indication and a location area identification (LAI); a second authentication information obtaining module 1202 configured to obtain authentication information through interaction with a home location register (HLR); a second authenticating module 1203 configured to perform authentication on the mobile terminal according to the authentication information; a location area updating module 1204 configured to, after the second authenticating module 1203 succeeds in the authentication, obtain the LAI from the location area update request message and implement, at least according to the LAI, a location area update; a location area update message sending module 1205 configured to send a location area update message to the home location register (HLR); and a routing area acknowledgment message sending module 1206 configured to send a location area update acknowledgment message to an SGSN.

The dual-mode mobile terminal described in the present invention is in a state of being attached to a PS domain of a 3G network and being attached to a CS domain of a 2G network. The dual-mode mobile terminal may specifically be a 3G mobile phone that supports dual modes or another mobile device.

In actual applications, the 3G network system described in the present invention may specifically be a TD-SCDMA communications system, an SCDMA communications system, or another communications system that is based on a 3G technology. The 2G network system may specifically be a GSM communications system.

Figure 13:
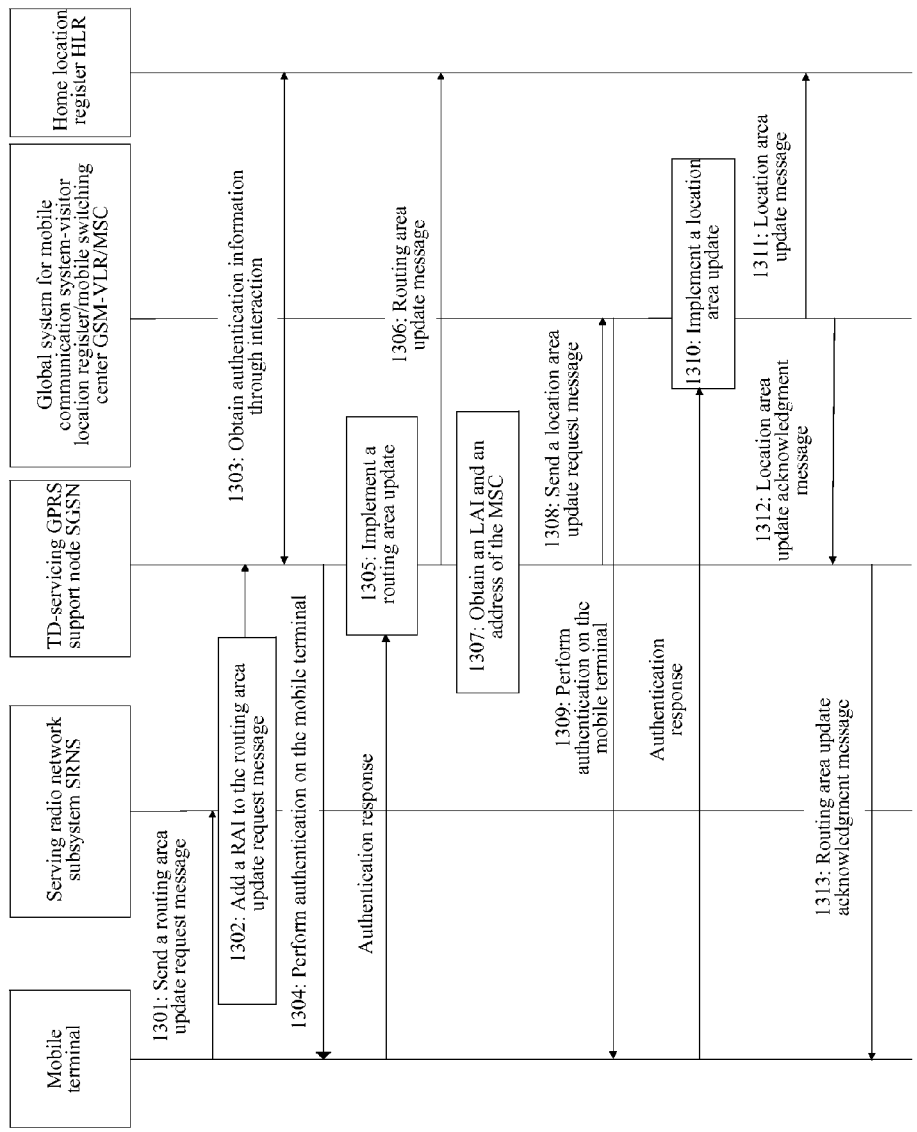
FIG. 13 is a signaling flowchart of implementing a location update in an actual scenario according to the present invention.

The following takes a case where a dual-mode mobile terminal performs a location area update in a GSM communications system at the same time of implementing a routing area update in a PS domain in a TD-SCDMA communications system for example. Referring to FIG. 13, a signaling flowchart of implementing a location update in an actual scenario according to the present invention is shown. The following may be included:

Step 1301: The mobile terminal sends a routing area update request message to an SRNS, where the routing area update request message contains a mixed location update indication.

Step 1302: The SRNS knows, according to the mixed location update indication, that the mobile terminal performs a mixed update process, adds an RAI to the routing area update request message, and sends the message to a TD-SGSN.

The TD-SGSN indicates an SGSN in the TD-SCDMA communications system.

Step 1303: The TD-SGSN interacts with an HLR to obtain authentication information.

Step 1304: The TD-SGSN performs authentication on the mobile terminal according to the authentication information.

Step 1305: After the authentication is successful, that is, after the TD-SGSN receives an authentication response of the mobile terminal, implement a routing area update according to the RAI.

Step 1306: Send a routing area update message to the HLR.

Step 1307: Obtain an LAI and an address of a VLR which are of the GSM system to which the mobile terminal belongs.

The LAI may be obtained through interception by the mobile terminal in the GSM system, or the LAI is obtained according to LAI=RAI+RAC in a case of joint network deployment. Then, according to an allocation principle of the LAI and VLR, the address of the VLR is known.

Step 1308: Send a location area update request message to the VLR.

The location area update request message contains the mixed location update indication and the LAI. The location area update request message further includes the authentication information.

Step 1309: Perform authentication on the mobile terminal according to the authentication information.

When the location area update request message received by the VLR does not include the authentication information, the VLR may further interact with the HLR to obtain the authentication information.

Step 1310: After the authentication is successful, that is, after the VLR receives an authentication response of the mobile terminal, interact with an MSC to implement a location area update.

Step 1311: The VLR sends a location area update request message to the HLR.

Step 1312: The VLR sends a location area update acknowledgment message to the TD-SGSN.

Step 1313: After receiving the location update acknowledgment message, the TD-SGSN sends a routing area update acknowledgment message to the mobile terminal to notify the mobile terminal of accepting the update.

In this embodiment, the dual-mode mobile terminal in the TD-SCDMA communications system performs the location area update in the GSM communications system at the same time of performing the routing area update, and the mobile terminal does not need to perform updates in the two systems separately, thereby implementing a mixed update process of a routing area and location area, reducing the workload of the mobile terminal, reducing power consumption, and improving the technical performance of the mobile terminal.

It should be noted that, in this document, relationship terms such as first and second are merely used to distinguish one entity or operation from another entity or operation but do not require or imply that such an actual relationship or sequence exists between these entities or operations. In addition, the terms "include," "contain" or any other variations are intended to cover non-exclusive inclusion, so that a process, method, article, or device that includes a series of elements not only includes those elements but also includes other elements that are not clearly listed, or also includes inherent elements of this process, method, article, or device. When no further restrictions are implemented, an element confined by an "includes one . . . " clause does not rule out other same elements in the process, method, article, or device that includes the element.

For easy description, the preceding apparatuses are divided into a variety of units according to functions for separate description. Of course, when implementing this application, the function of each of the units may be implemented in a same or a plurality of software programs and/or hardware components.

Each embodiment in this specification is described in a progressive manner. Each embodiment emphasizes on only the difference from other embodiments. For parts the same or similar between each embodiment and another, reference may be made to each other. The apparatuses disclosed in the embodiments correspond to the methods disclosed in the embodiments, and therefore, are described simply. For related parts, reference may be made to the illustration in the parts of the methods.

The preceding illustration disclosed in the embodiments allows those skilled in the art to implement or use the present invention. Multiple modifications to these embodiments are apparent for those skilled in the art. The general principle defined in this document may be implemented in other embodiments without departing from the spirit or scope of the present invention. Therefore, the present invention will not be limited to the embodiments described in the document but extends to the widest scope that complies with the principle and novelty disclosed in the document.

What is claimed is:

1. A method for implementing a location update comprising:
   receiving a routing area update request message which contains at least a mixed location update indication and a routing area identification (RAI) and is sent by a serving radio network subsystem (SRNS) of a third generation (3G) network system, wherein the routing area update request message which contains at least the mixed location update indication and the RAI is generated after the SRNS adds the RAI to a received routing area update request message which contains at least the mixed location update indication and is sent by a mobile terminal in the 3G network system, wherein the mixed location update indication indicates both a routing area update in the 3G network system and a location area update in a second generation (2G) network system when the mobile terminal is camping on both the 2G network system and the 3G network system;
   obtaining the RAI from the routing area update request message which contains at least the mixed location update indication and the RAI;
   performing, at least according to the RAI, the routing area update in the 3G network system;
   obtaining a location area identification (LAI) and an address of a visitor location register (VLR) which are of the 2G network system where the mobile terminal is located at least according to the routing area update request message which contains at least the mixed location update indication and the RAI; and
   sending a location area update request message, which contains at least the mixed location update indication and the LAI to the VLR of the 2G network system corresponding to the address of the VLR such that the VLR corresponding to the address of the VLR implements the location area update in the 2G network system at least according to the location area update request message, and wherein both routing date in the 3G network system and the location area update in the 2G network system are performed after the mobile terminal sends the mixed location update indication.

2. The method according to claim 1, wherein the routing area update request message further contains the LAI, and wherein the LAI is obtained through interception by the mobile terminal in the 2G network system.

3. The method of claim 2, wherein obtaining the LAI and the address of the VLR which are of the 2G network system where the mobile terminal is located comprises:
   obtaining, from the routing area update request message which contains at least the mixed location update indication and the RAI, the LAI of the 2G network system where the mobile terminal is located; and
   obtaining, according to a pre-saved allocation principle of the LAI and the VLR, the address of the VLR of the 2G network system where the mobile terminal is located.

4. The method according to claim 1, wherein obtaining the LAI and the address of the VLR which are of the 2G network system where the mobile terminal is located comprises:
   obtaining, according to the RAI and a saved routing area code, the LAI of the 2G network system where the mobile terminal is located, wherein the saved routing area code is stored by a serving general packet radio system support node (SGSN) of the 3G network system where the mobile terminal is located; and
   obtaining, according to a pre-saved allocation principle of the LAI and the VLR, the address of the VLR of the 2G network system where the mobile terminal is located.

5. The method according to claim 1, further comprising:
   storing a plurality of routing area codes corresponding to different coverage areas of the 2G network system;
   selecting one of the plurality of routing area codes based at least in part on which one of the plurality of different coverage areas of the 2G network system that the mobile terminal is currently located in; and
   determining, by a serving general packet radio system support node (SGSN) of the 3G network system, the LAI according to a formula that is a function of the selected one of the plurality of routing area codes and the RAI.

6. The method according to claim 1, wherein the routing area update and the location area update are both initiated based on receiving the one routing area update request message sent by the mobile terminal, and wherein the routing area update and the location area update are performed at a same time.

7. The method according to claim 1, further comprising sending information about the routing area update and/or the location area update to a home location register (HLR) such that the HLR stores and manages location information of the mobile terminal.

8. The method according to claim 1, further comprising:
receiving a location area update acknowledgement message from the VLR;
sending a routing area update acknowledgement message to the mobile terminal after receiving the location area update acknowledgement message; and
sending a routing area update message to the HLR.

9. The method according to claim 1, further comprising sending a routing area update acknowledgement message to the mobile terminal after receiving a location area update acknowledgement message from the VLR, wherein the routing area update acknowledgement message indicates to the mobile terminal that the routing area update in the 3G network system and the location area update in the 2G network system are completed.

10. A method for implementing a location update comprising:
receiving a location area update request message which contains at least a mixed location update indication and a location area identification (LAI) of a second generation (2G) network system where a mobile terminal is located, wherein the mixed location update indication indicates both a routing area update in a third generation (3G) network system and a location area update in the 2G network system when the mobile terminal is camping on both the 2G network system and the 3G network system, wherein the location area update request message is sent by a serving general packet radio service support node (SGSN) of the 3G network system in response to a routing area update request message sent by a serving radio network subsystem (SRNS), wherein the routing area update request message is generated after the SRNS adds a routing area identification (RAI) to a received routing area update request message which contains at least the mixed location update indication and is sent by the mobile terminal in the 3G network system, wherein the RAI is used by the SGSN to perform a routing area update in the 3G network system;
obtaining the LAI from the location area update request message; and
implementing, at least according to the LAI, a location area update in the 2G network system, wherein both the routing area update in the 3G network system and the location area update in the 2G network system are performed after the mobile terminal sends the mixed location update indication.

11. The method according to claim 10, wherein the location area update request message further contains authentication information.

12. The method according to claim 11, wherein implementing, at least according to the LAI, the location area update comprises:
performing, at least according to the authentication information, authentication on the mobile terminal; and
obtaining, after the authentication is successful, the LAI from the location area update request message and implementing, at least according to the LAI, the location area update.

13. The method according to claim 10, further comprising sending a location update acknowledgement to the SGSN such that a routing area update acknowledgement is sent to the mobile terminal, wherein the routing area update acknowledgement indicates to the mobile terminal that the routing area update in the 3G network system and the location area update in the 2G network system are completed.

14. A serving general packet radio service (GPRS) support node comprising:
a routing area request message receiving module configured to receive a routing area update request message which contains at least a mixed location update indication and a routing area identification (RAI) and is sent by a serving radio network subsystem (SRNS) of a third generation (3G) network system, wherein the routing area update request message which contains at least the mixed location update indication and the RAI is generated after the SRNS adds the RAI to a received routing area update request message which contains at least the mixed location update indication and is sent by a mobile terminal in the 3G network system, and wherein the mixed location update indication indicates both a routing area update in the 3G network and a location area update in a second generation (2G) network system when the mobile terminal is camping on both the 2G network system and the 3G network system;
a routing area updating module configured to obtain the RAI from the routing area update request message which contains at least the mixed location update indication and the RAI and is received by the routing area request message receiving module, and perform, at least according to the RAI, a routing area update in the 3G network system;
an obtaining module configured to, at least according to the routing area update request message which contains at least the mixed location update indication and the RAI, obtain a location area identification (LAI) and an address of a visitor location register (VLR) which are of the 2G network system where the mobile terminal is located; and
a sending module configured to send a location area update request message, which contains at least the mixed location update indication and the LAI to the VLR of the 2G network system corresponding to the address of the VLR such that the VLR corresponding to the address of the VLR implements the location area update in the 2G network system at least according to the location area update request message, and wherein both the routing area update in the 3G network system and the location area update in the 2G network system are performed after the mobile terminal sends the mixed location update indication.

15. The serving GPRS support node according to claim 14, wherein the obtaining module is further configured to, when the routing area update request message that contains at least the mixed location update indication and the routing area identification (RAI) further contains an LAI obtained through interception by the mobile terminal in the 2G network system, obtain, from the routing area update request message received by the receiving module, the LAI of the 2G network system where the mobile terminal is located, and according to a pre-saved allocation principle of the LAI and the VLR, obtain the address of the VLR of the 2G network system where the mobile terminal is located.

16. The serving GPRS support node according to claim 14, wherein the obtaining module is further configured to obtain, according to the RAI and a saved routing area stored by the serving GPRS of the 3G network system where the mobile terminal is located, the LAI of the 2G network system where the mobile terminal is located, and according to a pre-saved allocation principle of the LAI and the VLR, obtain the address of the VLR of the 2G network system where the mobile terminal is located.

17. The serving GPRS support node according to claim 14, wherein the sending module is configured to send the location area update request message to the VLR such that the location area update and the routing area update are performed at a same time, and wherein both the location area update and the routing area update are initiated based on the mobile terminal sending the one update request message.

18. The serving GPRS support node according to claim 14, wherein the sending module is further configured to:
   send a routing area update acknowledgement message to the mobile terminal after receiving a location area update acknowledgement message from the VLR; and
   send information about the routing area update and/or the location area update to the HLR such that the HLR stores and manages location information of the mobile terminal.

19. The serving GPRS support node according to claim 14, wherein the serving GPRS support node is a serving GPRS support node of a third generation (3G) network system, wherein the third generation network system comprises a wideband code division multiple access (WCDMA) network, a code division multiple access 2000 (CDMA2000) network, or a time division-synchronous code division multiple access (TD-SCDMA) network, wherein the 2G network system comprises a global system for mobile communications (GSM) network, and wherein the mobile terminal comprises a dual-mode mobile phone configured to support the 2G network system and the 3G network system.

20. The serving GPRS support node according to claim 14, wherein the sending module is further configured to send a routing area update acknowledgement message to the mobile terminal after receiving a location area update acknowledgement message from the VLR, wherein the routing area update acknowledgement message indicates to the mobile terminal that the routing area update in the 3G network system and the location area update in the 2G network system are completed.

21. A visitor location register comprising:
   a location area request message receiving module configured to receive a location area update request message which contains at least a mixed location update indication and a location area identification (LAI) of a second generation (2G) network system where a mobile terminal is located, wherein the mixed location update indication indicates both a routing area update in a third generation (3G) network system and a location area update in the 2G network system when the mobile terminal is camping on both the 2G network system and the 3G network system, wherein the location area update request message is sent by a serving general packet radio service support node (SGSN) of the 3G network system in response to a routing area update request message sent by a serving radio network subsystem (SRNS), wherein the routing area update request message is generated after the SRNS adds a routing area identification (RAI) to a received routing area update request message which contains at least the mixed location update indication and is sent by a mobile terminal in the 3G network system, wherein the RAI is used by the SGSN to perform a routing area update in the 3G network system; and
   a location area updating module configured to implement the location area update in the 2G network system, at least according to the LAI contained in the location area update request message received by the location area request message receiving module, and wherein both the routing area update in the 3G network system and the location area update in the 2G network system are performed after the mobile terminal sends the mixed location update indication.

22. The visitor location register according to claim 21, wherein the location area update request message further contains authentication information.

23. The visitor location register according to claim 22, further comprising:
   an authenticating module configured to perform authentication on the mobile terminal according to the authentication information, and
   wherein the location area updating module is further configured to, after the authenticating module succeeds in the authentication, implement the location area update, at least according to the LAI contained in the location area update request message received by the location area request message receiving module.

24. The visitor location register according to claim 21, wherein the location area update module is further configured to send a location update acknowledgement to the SGSN such that a routing area update acknowledgement is sent to the mobile terminal, wherein the routing area update acknowledgement indicates to the mobile terminal that the routing area update in the 3G network system and the location area update in the 2G network system are completed.

* * * * *